United States Patent Office 3,212,601
Patented Oct. 19, 1965

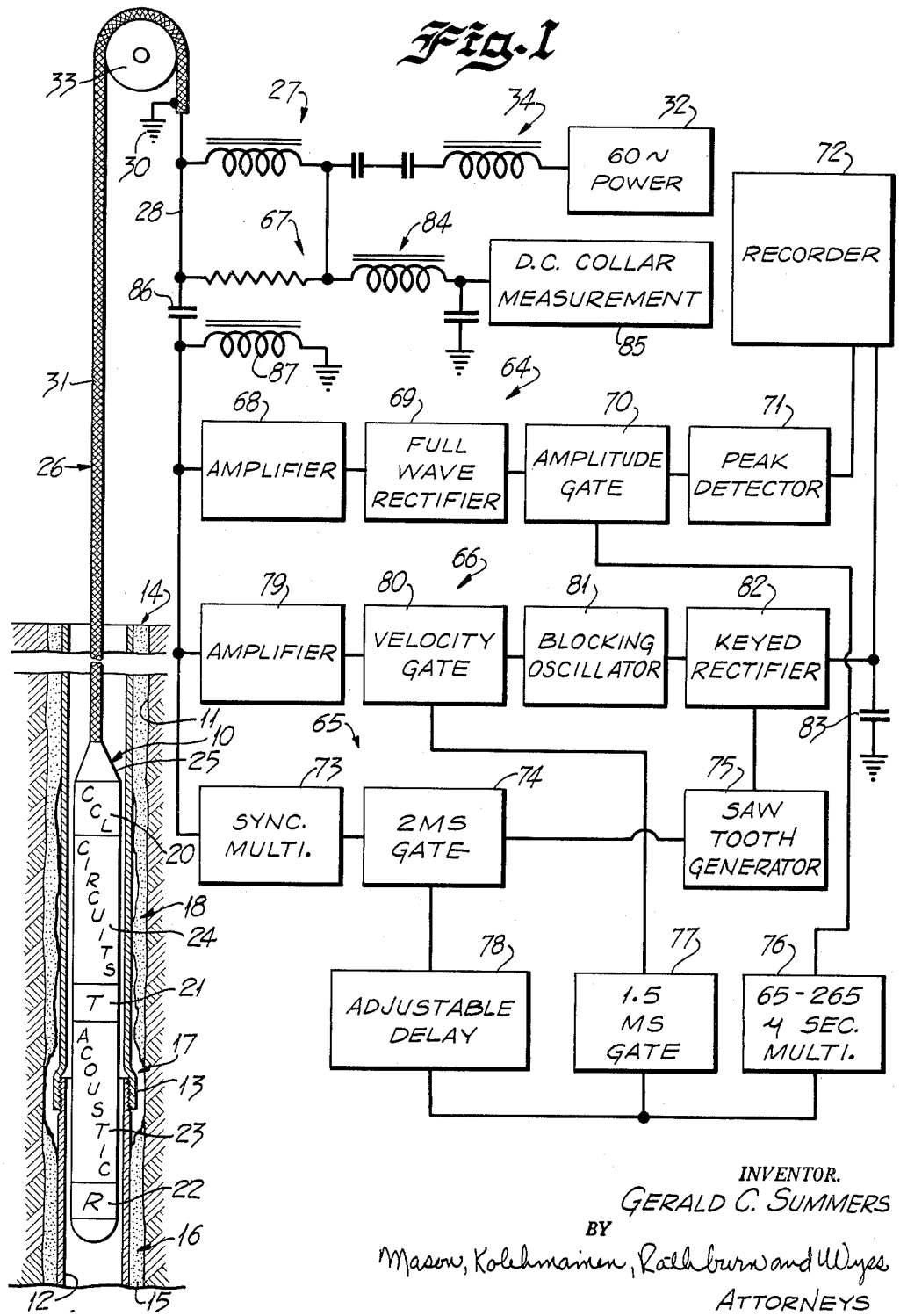

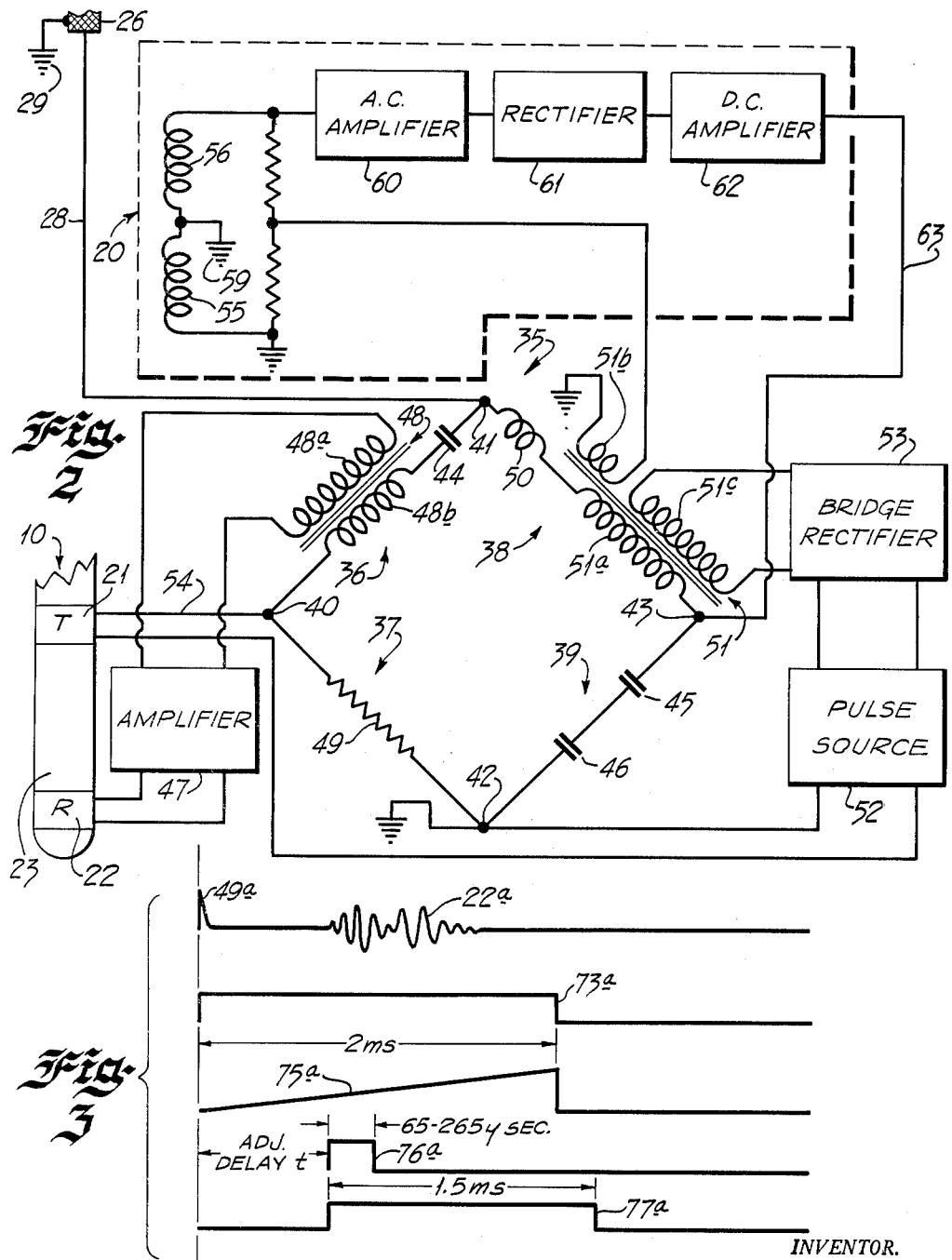

3,212,601
SINGLE CONDUCTOR ACOUSTIC WELL LOGGING SYSTEM
Gerald C. Summers, Dallas, Tex., assignor to PGAC Development Company, Houston, Tex., a corporation of Texas
Filed Mar. 1, 1962, Ser. No. 176,753
8 Claims. (Cl. 181—.5)

The present invention relates generally to acoustic well logging and is more particularly concerned with a new and improved system for determining the quality of the cement bond between the casing and the walls of a borehole.

In the production of water free hydrocarbons such as gas or oil from a well, it is common practice to insert cement into the spacing between the casing and the borehole walls, thus producing a squeeze effect at the level of the well where the hydrocarbons are being extracted. Frequently, the cement does not fill the entire space between the casing and the borehole walls due to failure to bond either with the earth formations or with the outer surface of the casing. It is important to be able to log the cased well to determine the quality of the cement bond at the different borehole depths of interest. One such system for accomplishing this result is disclosed and claimed in copending application Serial No. 181,859 filed by the present inventor simultaneously with the present application and assigned to the same assignee as the present invention.

The present invention is directed to a new and improved system for determining the quality of the cement bond while utilizing a cable having only a single inner conductor extending between the downhole tool and the surface measuring equipment. As is well known in logging operations, it is desirable to employ a cable having a minimum number of inner conductors for several reasons, first, because the cost of the cable, which is one of the highest cost items of the system, is materially reduced and, second, because the use of a multiple conductor cable increases the size and weight thus complicating the cable storage and reeling facilities and also introducing problems with respect to cable stretch. The amount of cable stretch is usually very difficult to determine and, as a result, it may cause inaccuracies in the log since the borehole depths indicated on the final record may differ from the actual location of the downhole tool within the borehole. For all of these reasons, it would be desirable to provide a system using only a single conductor cable.

As is explained in the above-identified copending application, it has been found that the attenuation of acoustic energy in passing from a transmitter to a spaced receiver is a very useful parameter in measuring the quality of the cement bond. Thus, in areas of the borehole where there is little or no cement or where the bond to the casing is very poor, the acoustic energy travels almost exclusively through the casing since the absence or poor quality of the bond prevents any appreciable refraction of the acoustic energy into the borehole formations with the result that it arrives at the receiver at a very high amplitude. On the other hand, when the cement bond is very good most of the acoustic energy is refracted through the earth formations and very little passes through the casing. Thus, a measurement of the amplitude of the energy reaching the receiver through the casing provides an indication of the quality of the cement bond. However, in some cases, particularly in logging high velocity layers such as limestone or dolomite, the energy travelling through the earth formations arrives at the receiver prior to the somewhat more slowly travelling energy passing through the casing. Thus, if a measurement is made of the amplitude of the signal initially arriving at the receiver, such a measurement, standing alone, cannot provide a determination of the cement bond quality because it is impossible to determine whether the casing signal or the formation signal is arriving first. However, if a velocity measurement is made simultaneously with the amplitude measurement to indicate the shortest travel time of the acoustic energy from the transmitter to the receiver irrespective of the path traversed, those areas where the formation signal arrives prior to the casing signal can be readily determined and this information can be used in analyzing the amplitude or attenuation log. The present invention, therefore, has for a principal object the provision of a new and improved well logging system for producing simultaneously an amplitude or attenuation curve and a velocity or travel time curve while, at the same time, utilizing only a single conductor cable extending between the downhole tool and the surface equipment.

Another object of the invention is to provide a new and improved single conductor, well logging system of the character described wherein a velocity curve is produced in response to signals arriving at a single receiver from a transmitter and, at the same time, a curve is made of the amplitude of these arriving signals as a function of borehole depth.

A further object of the invention is to provide a well logging system for simultaneously producing a velocity curve and an amplitude curve but which is, at the same time, characterized by simple, relatively inexpensive construction.

It is also an object of the invention to provide a new and improved single conductor, well logging system for developing a casing collar log simultaneously with the amplitude and velocity curves described above.

A further object of the present invention is to provide a new and improved well logging system employing a mixing circuit in the downhole tool supplied with A.C. power from the surface via a single conductor cable to pulse a transmitting transducer, the mixing circuit also being effective to supply to the surface equipment both synchronizing pulses and signals detected by a spaced receiver to permit simultaneous measurement of the velocity and attenuation of the energy from the transducer.

Another object of the invention is to provide a well logging system according to the preceding object wherein a casing collar signal is also applied across said mixing circuit for transmission over said single conductor to permit production of a casing collar curve at the surface.

The foregoing and other objects are realized, according to the present invention, by providing a well logging system employing a downhole tool carrying both a transmitter of successive spaced apart signal pulses and a receiver spaced a fixed distance from the transmitter in a direction extending longitudinally of the borehole. A casing collar locator section is also included in the downhole tool and preferably includes a conventional magnetic casing collar detector for developing D.C. signals which are applied across one arm of a mixing circuit in the downhole tool. The mixing circuit is also supplied with A.C. power applied from the surface via a single conductor cable to provide excitation for the electronic equipment in the downhole tool and to supply power for pulsing the transmitter at a predetermined repetition rate. Synchronizing signals developed coincident with the transmitter pulses appear across a second arm of the mixing circuit while signals detected by the receiver are applied across a third arm of the mixing circuit. The D.C. casing collar signals, the synchronizing pulses and the signals detected by the receiver are all transmitted over the single conductor cable to the surface where they are used to develop simultaneously a casing collar curve, a velocity or travel time curve and an amplitude or attenuation curve.

The invention, both as to its organization and manner of operation, together with further objects and advantages, will best be understood by reference to the following description taken in conjunction with the accompanying drawings wherein:

FIG. 1 is a partially schematic, partially diagrammatic view of a well logging system characterized by the features of the present invention with the downhole tool of the system being illustrated within a section of a cased borehole extending into the earth;

FIG. 2 is a schematic diagram showing the circuits employed in the downhole tool used in the system shown in FIG. 1; and FIG. 3 shows a group of typical waveforms which are useful in explaining the operation of the system shown in FIG. 1.

Referring now to the drawings and first to FIG. 1, a well logging system embodying the principles of the present invention is there shown as including a downhole tool 10 disposed within a borehole 11 extending into the earth from the surface. The borehole 11 has been cased by a plurality of casing sections 12 secured together in end to end relationship, as, for example, by threading one end of each section into a collar 13 formed on the adjacent section. The casing is usually formed of steel and obviously a double thickness of such material exists at each of the casing joints or collars 13.

As was previously indicated, it is often desirable in the production of hydrocarbons to pour cement into the generally annular space 14 existing between the casing sections 12 and the walls of the borehole 11, this cement being identified by the reference numeral 15 in FIG. 1. As is shown in the drawings, the cement 15 does not always bond firmly to the outer periphery of the casing sections 12 or to the borehole walls and, as a result, there may exist at different borehole depths areas such as that shown at 16 where the bonding is very good, areas such as that shown at 17 where there is little or no cement, and other areas such as that shown at 18 where the cement bond is of intermediate quality.

The well logging system of the present invention is adapted to provide information useful in indicating the quality of the cement bond at the different borehole depths and, to this end, it produces simultaneously an amplitude or attenuation curve, a velocity or travel time curve and a casing collar curve for indicating the borehole depths at which the collars 13 are located. To provide these three curves, the downhole tool 10 includes a casing collar detecting section 20, a transmitting transducer or transmitter section 21, a receiving transducer or receiver section 22, an acoustic isolating section 23 which spaces and electrically insulates the sections 21 and 22, and a transreceiver or electronic section 24 containing the electronic components of the downhole tool described more fully hereinafter. The sections of the downhole tool are housed within generally cylindrical casings provided with threaded couplings (not shown) at both ends to facilitate securing them together end to end in well known manner. Suitable electrical connectors are provided between the different sections but these are conventional and, hence, are not shown in the drawings. The uppermost section 20 is secured to a cable head 25 which is, in turn, connected to the lower end of a cable 26 extending through the borehole and connected at the earth's surface to surface equipment indicated generally by the reference numeral 27. In accordance with the present invention, the cable 26 provides the necessary electrical circuit connections between the downhole tool 10 and the surface equipment 27 while utilizing a single inner or central conductor 28 housed within an outer conducting sheath 31. The outer sheath is grounded at 29 in the downhole tool 10 and at 30 in the surface equipment to provide a common ground connection. At the surface the cable 26 is trained over a sheave 33 which is motor driven and which cooperates with the cable to form a means to raise or lower the tool 10 within the borehole.

Power for the electronic circuits of the downhole tool 10 is supplied from a conventional 60 cycle A.C. power source 32 in the surface equipment through a 60 cycle filter 34 and through the conductor 28, the return connection, of course, being provided by the grounded outer sheath 31. In accordance with another important feature of the present invention, the 60 cycle power is delivered to a mixing circuit 35 (FIG. 2) which not only supplies power to the downhole tool but also combines for transmission to the surface equipment 27 the casing collar signals, the synchronizing pulses and the signals detected by the receiver 22. To this end, the mixing circuit is comprised of four arms 36, 37, 38 and 39 joined together to form four terminals 40, 41, 42 and 43. The terminal 42 is grounded so that it is effectively connected to the return sheath 31. The terminal 41 is connected to the single conductor 28 of the cable. Casing collar signals from the collar locator section 20 are applied across a pair of large (for example, 80 microfarads each) series connected condensers 45 and 46 forming the arm 39 so that these signals may be transmitted to the surface equipment 27 in a manner described more fully below. Signals from the receiver section 22 are passed through an amplifier 47 having its output connected to one winding 48a of a transformer 48, the other winding 48b of which is connected in series with a relatively large capacitor 44 to form the arm 36. Synchronizing pulses developed in coincidence with the acoustic pulses from the transmitter 21 are applied across a relatively small resistor 49 in the bridge arm 37. One of the synchronizing pulses is identified in FIG. 3 by the reference numeral 49a. The receiver output is indicated at FIG. 3 by the reference numeral 22a and the waveform there shown represents the combined signal appearing between the bridge terminal 41 and ground 44.

The 60 cycle power supplied from the source 32 via the conductor 28 passes through a high frequency choke 50, through the primary winding 51a of a power transformer 51 and through the very large condensers 45 and 46 to the grounded return sheath 31. The transformer 51 has a first secondary winding 51b for supplying A.C. excitation for the casing collar locator 20 and a second winding 51c for supplying A.C. power to pulse the transmitter 21. The choke 50 and the primary winding 51a are connected in series between the terminals 41 and 43 to form the arm 38. The high frequency choke 50 presents a high impedance to the 20,000 cycle signal output of the receiver 22 and to the synchronizing pulses, thereby isolating the power transformer from both of these signals. However, this choke presents a low impedance to the 60 cycle power frequency. In one form of the invention which was found to produce satisfactory results the capacitor 44 was about one microfarad while the resistor 49 was about 2 ohms. Thus, at the 60 cycle power frequency the condenser 44 has a reactance of 6700 ohms so that it effectively prevents the impression of the power frequency across the winding 48b of the transformer. This prevents the application of the power frequency to the collector circuits of the transistors in the amplifier 47. At the characteristic frequency of the acoustic signal or about 20,000 cycles the condenser has a reactance of 8 ohms and, as a consequence, it offers very little impedance to the acoustic signal from the amplifier 47 or to the synchronizing pulse developed across the resistor 49.

As is shown in FIG. 2, the transmitting section 21 includes a transmitting transducer and a free-running high-power pulse source 52 of the type described in U.S. Patent No. 2,737,639. The pulse source 52 is excited by the D.C. power supplied from a conventional full wave bridge rectifier 53 and causes the transmitting transducer to emit acoustic pulses at a suitable repetition rate, for example, at a rate of about 15 to 30 pulses per second. In the ensuing description, a repetition rate of 20 pulses per second will be assumed thus providing a period of 50 milliseconds between successive pulses. While the receiver 22 may be spaced from the transmitter 21 any suitable distance, preferably provision is made for a spacing of 4, 5, 6, 7 or 8 feet by insertion of an acoustic section 23 of proper length. In any event, the spacing is such that all of the energy necessary for the production of the velocity and amplitude curves will arrive at the receiver 22 within a few milliseconds following the acoustic pulse and, hence, the velocity and amplitude measurements are made during this short interval which may be referred to as the measuring interval. In the waveforms shown in FIG. 3, only the events occurring during the measuring interval have been depicted since the remaining portions of each 50 millisecond period are insignificant. The transmitting transducer and its associated pulse source 52 comprise means for generating a series of spaced apart acoustic or elastic pulses coupled by the borehole fluid to the casing sections 12 and from the casing sections through the cement 15 to the earth formations surrounding the borehole. As is described in copending application Serial No. 846,974, filed October 16, 1959, and assigned to the same assignee as the present invention, a small portion of each pulse from the transmitting transducer is used to develop the synchronizing pulse 49a which appears upon a lead 54 connected to the mixing circuit terminal 40. The synchronizing pulse passes through the transformer secondary winding 48b which appears like a 50 ohm resistor when the primary of the transformer 48 is driven by a properly terminated amplifier 47. The synchronizing pulse then passes from the winding 48b through the condenser 44 to the terminal 41 where it is confronted by the high impedance of the choke 50 and, hence, cannot pass to ground through the arms 38 and 39. The pulse thus passes up the conductor 28 to the surface equipment 27 where it is used for timing purposes in a manner described in detail hereinafter.

The receiver section includes a receiving transducer of conventional construction for converting the received acoustic or elastic energy into corresponding electrical signals which are passed through the amplifier 47 to the arm 36 for transmission through the condenser 44 to the mixing circuit terminal 41. As was indicated above, the choke 50 prevents the 20,000 cycle receiver signal from passing through the arms 38 and 39 and, as a result, this signal is passed up the conductor 28 to the surface equipment 27. The casing collar locating section 20 is preferably of the conventional magnetic type utilizing a pair of normally balanced detecting coils 55 and 56 having an equal number of turns. The coils are connected together and their junction is grounded as indicated at 59. A.C. voltage for exciting the coils is supplied from the transformer winding 51b and is developed across a pair of equal value resistors 57 and 58. Equal voltages are thus applied across both coils from the winding 51b. When the downhole tool 10 is moved through the borehole, the voltage across the coils will become unbalanced as they approach a casing collar 13 due to the effect of the increased thickness of the casing upon the magnetic fields or the flux linkages between the coils. This unbalance creates a control signal which is applied through an A.C. amplifier 60 to a half wave rectifier 61. The D.C. output of the rectifier 61 is amplified by a D.C. amplifier 62 which has its output connected via a lead 63 to the bridge terminal 43. The D.C. or very low frequency casing collar signals appearing on the lead 63 are, of course, blocked by the capacitors 45 and 46 but they are passed through the transformer winding 51a and through the high frequency choke 50 to the terminal. The condenser 44 prevents the casing collar signals from reaching the winding 48b or the resistor 49 so that these signals pass from the terminal 41 through the conductor 28 to the surface equipment 27. If the downhole tool is moved through the borehole at constant speed, collars 13 will be encountered at uniform intervals since the casing sections 12 are of equal length. Since normally the casing sections are 60 feet long, it is apparent that the collars will be encountered relatively infrequently when compared with the repetition rate of the transmitter 21. Thus, most of the measuring periods are not affected by the presence of the casing collars.

The synchronizing pulses 49a, the casing collar signals and the output 22a of the receiver 22 appearing on the conductor 28 are applied to the surface equipment 27 to an amplitude measuring channel 64, a timing channel 65, a velocity measuring channel 66 and a casing collar measuring channel 67. The channel 67 responds to the D.C. casing collar signals by providing a casing collar measurement or curve. The channel 64 provides the amplitude measurement and the channel 66 provides the velocity or travel time measurement. The channel 65 functions to gate both the amplitude measuring channel and the velocity measuring channel so that these channels are not triggered by spurious noises or the like and, hence, respond to desired signals arriving at the receiver 22 from the transmitter 21. More specifically, the amplitude measuring channel 64 comprises an amplifier 68 for amplifying the signals 22a detected by the receiver 22 and for passing these signals to a full wave rectifier circuit 69 which develops D.C. signals for application to an amplitude channel gate circuit 70. The latter gate circuit may be of the type disclosed in U.S. Patent No. 2,862,104. The circuit 70 is rendered conductive for a short, predetermined gating interval to supply rectified signals to a conventional peak riding detector 71 which provides a D.C. output proportional to the peak amplitude of the signals detected by the receiver 22 during the gating interval. The D.C. output from the peak riding detector 71 is applied to a first recorder drive of a conventional recorder 72. The latter recorder may include a plurality of recording galvanometers one of which is controlled by the first drive to deflect a light beam impinging upon a sensitized recording medium driven past the beam in synchronism with the sheave 33. The deflection of the beam is, of course, proportional to the D.C. voltage from the peak detector 71 and, as a result, the recorder develops a first continuous curve representing the peak amplitude of the pulses arriving at the receiver during the gating interval. In the alternative, the first drive may control a recording pen or stylus acting upon a recording medium. In either case, the curve developed by the first recorder drive is a conventional amplitude curve and the record may, if desired, be calibrated in terms of attenuation in view of the fact that the amplitude of the detected signal is inversely proportional to the attenuation introduced by the earth formations or by the casing.

Turning next to the timing channel, it will be observed that this channel comprises a monostable or one shot multivibrator 73 which responds to each of the synchronizing pulses 49a by providing a rectangular wave output 73a which is applied to a gate 74 of the type disclosed in U.S. Patent No. 2,862,104. The square wave 73a has a duration somewhat longer than the time required for the acoustic pulse to travel from the transmitter 21 to the receiver 22 and it may, for example, be about 2 milliseconds in width. The gate 74 is normally non-conductive but is rendered conductive by the gating square wave 73a. Thus, noise or spurious signals arriving after the gating pulse 73a have no effect on the timing channel 65. The square wave from the multivibrator is applied to a timing signal or sawtooth generator 75 for developing a gradually changing or monotonically varying output signal 75a. Preferably, the generator 75 is a conventional bootstrap sawtooth generator of the type described in U.S. Patent No. Re. 24,446 for producing a sawtooth wave having its initial rise beginning with the synchronizing pulse 49a and continuing to rise linearly for the duration of the square wave 73a.

The timing channel 65 further includes a first gate circuit 76 for developing a relatively narrow square wave output 76a to control the conduction of the amplitude channel gate circuit 70 and a second gate circuit 77 for developing a wider square wave 77a to gate the velocity channel 66 in a manner described more fully below. The gates 76 and 77, like the circuit 73 described above, preferably comprise monostable multivibrator circuits of the general type shown in U.S. Patent No. Re. 24,446. To develop the square waves 76a and 77a at the proper time, the output of the multivibrator 73 is passed through an adjustable delay circuit 78 to delay the start of both gating signals 76a and 77a for a predetermined but adjustable period t following the synchronizing pulse 49a. The delay circuit 78 may be of the type shown and described in U.S. Patent No. 2,768,701. The delay period t may be adjusted by the circuit 78 to correspond with the diameter of the casing and to compensate for the differences in travel time of pulses through the borehole fluid when boreholes of different casing diameter are being logged. During the logging of a particular well, the circuit 78 is not adjusted and, hence, it introduces a fixed time delay. In any event, the delay period t is selected so that it is slightly less than the time required for the acoustic pulse to pass from the transmitter 21, through the borehole fluid, through the casing sections 12 and back through the fluid to the receiver 22. Both of the gate circuits 76 and 77 comprise a monostable multivibrator which is triggered by the leading edge of the delayed square wave from the delay circuit 78. The duration of the gate signal 76a may be varied by adjusting the resistors or capacitors of the multivibrator circuit in well known manner but preferably this gate signal covers a fixed interval having a duration between 65 and 265 microseconds. The velocity of the signals travelling through the casing is, of course, constant and, as a result, these signals arrive at the receiver 22 sometime near the middle of the gating signal 76a. The amplitude channel gate circuit 70 is non-conductive until it receives the square wave gating signal 76a and, hence, both during the delay period t and after the termination of the gating signal 76a no signals are passed to the peak detector 71. This prevents the amplitude channel 64 from responding to noises or other signals which do not fall within the gating interval of the wave 76a. Signals detected by the downhole receiver 22 during the period of the gating signal 76a are passed to the detector 71 to make the amplitude measurement in the manner described above.

Turning next to the velocity channel 66, it will be observed that this channel includes an amplifier 79 for amplifying the signal 22a from the receiver. The output from the amplifier 79 is passed to a velocity channel gate circuit 80 the conductivity of which is controlled by the square wave 77a. The latter wave has a duration considerably longer than that of the wave 76a, for example, about 1.5 milliseconds. The velocity channel gate 80, which may be of the type disclosed in U.S. Patent No. 2,862,104, is normally non-conductive but is rendered conductive by the gating signal 77a to pass signals to a blocking oscillator 81. The blocking oscillator may be of the type described in MIT Radiation Laboratory Series, Volume 19, Waveforms, McGraw-Hill, 1949, at page 218, FIG. 6.7. The gate 80 obviously cannot pass signals to the blocking oscillator either during the adjustable delay period t or after the termination of the gating signal 77a and, hence, the velocity channel responds only to signals arriving at the receiver 22a during the interval of the signal 77a. In response to the first pulse arriving at the receiver during the latter interval, the blocking oscillator 81 produces a sharp trigger pulse to excite a keyed rectifier circuit 82 which is also supplied with the linear sawtooth wave 75a from the sawtooth generator 75. The keyed rectifier 82 may be identical to the switch unit identified by the reference numeral 32 in U.S. Patent No. Re. 24,446, and is effective to control the charging and discharging of a storage capacitor 83 connected across its output. As will be evident from an understanding of the latter patent, the blocking oscillator 81 triggers the keyed rectifier circuit 82 to charge the capacitor 83 to a level corresponding to the amplitude of the sawtooth wave 75a at a time corresponding to the instant of first arrival of the acoustic pulse from the transmitter 21 at the receiver 22 during the gate period 77a. The blocking oscillator 81 will be triggered either by the casing signals arriving at the receiver or by signals travelling through the earth formations and arriving at the receiver either just prior to or somewhat subsequent to the casing signals. During the next succeeding cycle or period, if the first arrival at the receiver 22 occurs earlier than the previous one, thus indicating a higher velocity of propagation, the sawtooth 75a will have reached a lower level at the time when the blocking oscillator 81 is triggered so that the capacitor 83 discharges to a somewhat lower level. Conversely, if the first energy arriving at the receiver during the next cycle is later than the previous one the charge on the capacitor 83 is increased to a higher level. Thus, the voltage across the capacitor is proportional to the time expiring between the transmission of a pulse from the transmitter 21 and the arrival of the first portion of the resulting energy at the receiver 22. This voltage is applied to a second recorder drive or additional recording means of the recorder 72 to develop a conventional single receiver, continuous curve representing, as a function of borehole depth, the propagation velocities of the different formations disposed between the transmitter 21 and the receiver 22 as the tool 10 is moved within the borehole 11. At the borehole depths where the earth formations are of high velocity, the earth formation signals arrive at the receiver 22 prior to the signals travelling through the casing sections 12 and, as a result, a high velocity indication is provided on the velocity curve. However, in areas where the earth formation signals arrive subsequent to the casing signals, the formation signals have no effect on the velocity curve provided, of course, that the casing signals are of sufficient amplitude to trigger the blocking oscillator 81. If the amplitude of the casing signals is very low, thus indicating a good cement bond, the subsequently arriving signals will provide a low velocity indication, that is, a velocity lower than that of the casing. Both the velocity curve and the amplitude curve are developed simultaneously and appear side by side on the record produced by the recorder 72 to facilitate their comparison so that the analyst can readily determine the quality of the cement bond.

The D.C. casing signals on the conductor 28 are applied through a filter 84 to a collar signal measuring circuit 85 which provides a D.C. to a collar signal measuring circuit 85 which provides a D.C. output for driving a third recorder drive of the recorder 72. This third drive thus produces a third casing collar curve simultaneously with the amplitude and velocity curves. Of course, the casing collar curve could be developed on a separate record, if desired.

A condenser 86 prevents the D.C. casing collar signals from affecting the channels 64, 65 and 66 while the filter 34 obviously isolates the A.C. source 32 from the casing collar signals. The condenser 86 and an associated choke 87 prevent the 60 cycle power frequency from entering the channels 64, 65 and 66 thus sending the power frequency down the conductor 28 to the mixing circuit 35. The filters 34 and 84 block the high frequency synchronizing pulse and receiver output signals. In addition, the filter 84 blocks the 60 cycle A.C. power from the source 32 to prevent it from entering the collar measuring circuit 85.

The operation of the system described above to produce the casing collar, amplitude and velocity curves as the downhole tool 10 is moved through a predetermined length of the borehole 11 by driving the sheave 33 is believed to be obvious in view of the foregoing description. Since the log produced by the system described is similar to that developed by the arrangement disclosed in the copending application Serial No. 181,859 described above, the analysis of this record to determine the quality of the cement bond will be obvious in view of the detailed description of the record analysis procedure set forth in the latter application. In those areas of the record where the amplitude curve shows a very low attenuation while the velocity curve shows a velocity coinciding with the velocity of propagation of the acoustic energy through the steel casing sections or a lower velocity, a poor cement bond is indicated. In areas where the velocity curve shows a velocity of propagation higher than that of the steel casing as might be caused, for example, when the earth formation signals pass through limestone or dolomite formations which transmit the acoustic energy at a high energy level, the analyst knows that the amplitude curve does not show the attenuation of the casing and, hence, the information in these areas is suspect and must be interpreted more thoroughly. The amplitude curve alone may not provide completely reliable results and may lead to unnecessary squeeze jobs or cement bonds in areas where the bond is already adequate. However, the simultaneous recording of both the amplitude and single receiver velocity curves minimizes the confusion by providing more reliable information to improve the cement techniques, thus reducing the total bonding cost.

While the invention has been described in conjunction with an illustrative embodiment, it will be understood that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a system for logging a cased borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses, a casing collar locator for developing D.C. signals having an amplitude which is a function of the thickness of the borehole casing in the vicinity of said downhole tool; a mixing circuit in the downhole tool having four arms joined to form four circuit terminals, means connecting a first of said arms to receive the output of the receiver, means connecting a second of said arms to receive the synchronizing pulses, said first and second arms being joined together to form a first of said terminals, means connecting a third of said arms to receive the D.C. signals from the casing collar locator, said third arm being joined to said second arm to form a second terminal connected to said conducting sheath, a fourth of said arms including the primary winding of a power transformer having a first secondary winding connected to said casing collar locator and a second secondary winding connected to supply power to said transmitter, said fourth arm being connected between said first and third arms to form third and fourth terminals, respectively, said inner conductor being connected to said third terminal to supply to the surface equipment via said single conductor said D.C. signals, said synchronizing pulses and the receiver output, said surface equipment comprising an A.C. power supply connected to said inner conductor to supply A.C. power to said fourth arm of said mixing circuit, a capacitor connected in one of said first and second arms providing a high impedance to said A.C. power but to offer a much lower impedance to the receiver output signals, a choke in one of said third and fourth arms offering a low impedance to said A.C. power but offering a much higher impedance to the receiver output signals and to the synchronizing pulses, recording means responsive to the D.C. signals for providing a first curve indicative of the thickness of the casing at the different borehole depths traversed by said downhole tool, and additional recording means responsive to the synchronizing pulses and to the receiver output for developing as a function of borehole depth a second curve proportional to the travel time of the acoustic pulse from the transmitter to the receiver and for simultaneously developing a third curve proportional to the amplitude of the acoustic pulses detected by the receiver at the different borehole depths traversed by the downhole tool.

2. In a system for logging a cased borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses, a casing collar locator for developing collar locating signals at least one characteristic affected by the thickness of the borehole casing in the vicinity of said downhole tool; a mixing circuit in the downhole tool having four arms joined to form four circuit terminals, means connecting a first of said arms to receive the output of the receiver, means connecting a second of said arms to receive the synchronizing pulses, said first and second arms being joined together to form a first of said terminals, means connecting a third of said arms to receive the collar locating signals from the casing collar locator, said third arm being joined to said second arm to form a second terminal connected to said conducting sheath, a fourth of said arms including the primary winding of a power transformer having a secondary winding connected to supply power to said transmitter, said fourth arm being connected between said first and third arms to form third and fourth terminals, respectively, said inner conductor being connected to said third terminal to supply to the surface equipment via said single conductor said collar locating signals, said synchronizing pulses and the receiver output, said surface equipment comprising an A.C. power supply connected to said inner conductor to supply power to said fourth arm of said mixing circuit, recording means responsive to the collar locating signals for providing a first curve indicative of the thickness of the casing at the different borehole depths traversed by said downhole tool, and additional recording means responsive to the synchronizing pulses and to the receiver output for developing as a function of borehole depth a second curve proportional to the travel time of the acoustic pulse from the transmitter to the receiver and for simultaneously developing a third curve proportional to the amplitude of the acoustic pulses detected by the receiver at the different borehole depths traversed by the downhole tool.

3. In a system for logging a borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses; a mixing circuit in the downhole tool having a plurality of arms joined to form a number of circuit terminals, means connecting a first of said arms to receive the output of the receiver, means connecting a second of said arms to receive the synchronizing pulse, a third of said arms including the primary winding of a power transformer having a secondary winding connected to supply power to said transmitter, said third arm being connected to one of said first and second arms to form one of said terminals, said inner conductor being connected to said one terminal to supply to the surface equipment said synchronizing pulses and the receiver output, said surface equipment comprising an A.C. power supply connected to said inner conductor to supply A.C. power to said third arm of said bridge circuit, recording means in the surface equipment responsive to the synchronizing pulses and to the receiver output for developing as a function of borehole depth a first curve proportional to the travel time of the acoustic pulse from the transmitter to the receiver and for simultaneously developing a second curve proportional to the amplitude of the acoustic pulses detected by the receiver at the different borehole depths traversed by the downhole tool.

4. In a system for logging a borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses; a mixing circuit in the downhole tool having a plurality of arms joined to form a number of circuit terminals, means connecting a first of said arms to receive the output of the receiver, means connecting a second of said arms to receive the synchronizing pulse, a third of said arms including the primary winding of a power transformer having a secondary winding connected to supply power to said transmitter, said third arm being connected to one of said first and second arms to form one of said terminals, said inner conductor being connected to said one terminal to supply to the surface equipment said synchronizing pulses and the receiver output, said surface equipment comprising an A.C. power supply connected to said inner conductor to supply A.C. power to said third arm of said bridge circuit, a capacitor connected in one of said first and second arms providing a high impedance to said A.C. power but to offer a much lower impedance to the receiver output signals, a choke in said third arm offering a high impedance to the receiver output signals and to the synchronizing pulses but offering a much lower impedance to the A.C. power, recording means in the surface equipment responsive to the synchronizing pulses and to the receiver output for developing as a function of borehole depth a first curve proportional to the travel time of the acoustic pulse from the transmitter to the receiver and for simultaneously developing a second curve proportional to the amplitude of the acoustic pulses detected by the receiver at the different borehole depths traversed by the downhole tool.

5. In a system for logging a borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses, a casing collar locator for developing casing collar signals having an amplitude which is a function of the thickness of the borehole casing in the vicinity of said downhole tool; a common transmission circuit including said inner conductor and a bridge circuit in the downhole tool jointly responsive to the casing collar signals, the synchronizing pulses and the receiver output for transmitting to the surface equipment said casing collar signals, said synchronizing pulses and the receiver output, said surface equipment comprising an A.C. power supply connected to said inner conductor to supply power to said common transmission circuit and via said inner conductor and bridge circuit to the downhole tool, recording means in the surface equipment responsive to said casing collar signals for providing a first curve indicative of the thickness of the casing at the different borehole depths traversed by said downhole tool, and additional recording means responsive to the synchronizing pulses and to the receiver output for developing as a function of borehole depth a second curve proportional to the travel time of the acoustic pulse from the transmitter to the receiver, gating means in the surface equipment responsive to said receiver output and to said synchronizing pulses for passing a predetermined portion of the initial arrivals of acoustic pulses at said receiver, and means responsive to the output of the gating means for developing a third curve proportional to the amplitude of the acoustic pulses detected by the receiver at the different borehole depths traversed by the downhole tool simultaneously with the second curve.

6. In a system for logging a cased borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses, a casing collar locator for developing collar locating signals having a characteristic affected by the thickness of the borehole casing in the vicinity of said downhole tool; a common transmission circuit including said single conductor and a bridge circuit in the downhole tool jointly responsive to said collar locating signals, said synchronizing pulses and the output of said receiver for transmitting to said surface equipment said collar locating signals, said synchronizing pulses and the receiver output, said surface equipment including an A.C. power supply connected to said conductor via supply power to said transmission circuit to said downhole tool, recording means responsive to the collar locating signals for providing a first curve indicative of the thickness of the casing at the different borehole depths traversed by said downhole tool, and additional recording means responsive to the synchronizing pulses and to the receiver output for developing as a function of borehole depth a second curve proportional to the travel time of the acoustic pulse from the transmitter to the receiver, gating means in the surface equipment for passing a predetermined portion of the initial arrivals of said acoustic pulses at said receiver, and means responsive to said receiver output for developing a third curve proportional to the amplitude of the acoustic pulses detected by the receiver at the different borehole depths traversed by the downhole tool simultaneously with the second curve.

7. In a system for logging a borehole the combination of a downhole tool within the borehole; a cable having a single inner conductor within a conducting sheath and extending from the downhole tool through the borehole to the earth's surface; means cooperating with said cable to raise and lower the tool within the borehole; and equipment at the earth's surface connected to said cable; said downhole tool comprising a transmitter for repeatedly emitting spaced apart acoustic pulses and for generating a synchronizing pulse simultaneously with each acoustic pulse, a receiver spaced a fixed distance from said transmitter in a direction extending longitudinally of the borehole for receiving said acoustic pulses, a transmission circuit including said single conductor and a bridge circuit in the downhole tool jointly responsive to the synchronizing pulses and the receiver output for transmitting said synchronizing pulses and the receiver output to said surface equipment, said surface equipment comprising an A.C. power supply connected to said inner conductor to supply power to said downhole tool via said transmission circuit, recording means responsive to the synchronizing pulses and to the receiver output for developing as a function of borehole depth a first curve proportional to the travel time of the acoustic pulse from the transmitter to the receiver and means responsive to said receiver output for developing a second curve proportional to the amplitude of the acoustic pulses detected by the receiver at the different borehole depths traversed by the downhole tool simultaneously with the first curve.

8. In a system for logging a cased borehole the combination of a downhole tool within the borehole; a cable having a single inner conductor within an outer sheath and extending from the downhole tool through the borehole to the earth's surface; means at the surface cooperating with the cable to raise and lower the downhole tool within the borehole; and equipment at the surface connected to said cable; said downhole tool comprising a casing collar locator for providing collar locating signals having at least one characteristic affected by the casing thickness, a transmitter for repeatedly emitting spaced apart acoustic pulses and for producing a synchronizing pulse coincident with each acoustic pulse, a receiver output for transmitting to said surface equipping longitudinally of the borehole for receiving said acoustic pulses and for developing corresponding electrical signals, means including a bridge circuit in the downhole tool connected to said single conductor and jointly responsive to the synchronizing pulses and the receiver output for transmitting to said surface equipment over said single conductor said collar locating signals, said synchronizing pulses and said electrical signals; said surface equipment including recording means connected to said inner conductor for developing from said collar locating signals a first curve indicating variations in said characteristic at different borehole depths traversed by the downhole tool, additional recording means for developing in response to said synchronizing pulses and said electrical signals a second curve proportional to the travel time of the acoustic pulses from the transmitter to the receiver at the different borehole depths and means responsive to said electrical signals and said synchronizing pulses for developing a third curve proportional to the amplitude of the electrical signals at the different borehole depths.

References Cited by the Examiner
UNITED STATES PATENTS

| | | | |
|---|---|---|---|
| 2,233,992 | 3/41 | Wyckoff | 340—18 X |
| 2,368,532 | 1/45 | Fearon | 340—18 X |
| 2,554,844 | 5/51 | Swift | 340—18 X |
| 2,857,011 | 10/58 | Summers | 181—0.5 |
| 3,019,414 | 1/62 | Peterson | 181—0.5 |
| 3,102,992 | 10/63 | Savage et al. | 340—18 |

SAMUEL FEINBERG, *Primary Examiner.*

CHESTER L. JUSTUS, *Examiner.*